March 1, 1966  K. C. MARKEGARD  3,237,603
HYDRAULIC CATTLE VISE
Filed May 7, 1964  3 Sheets-Sheet 1
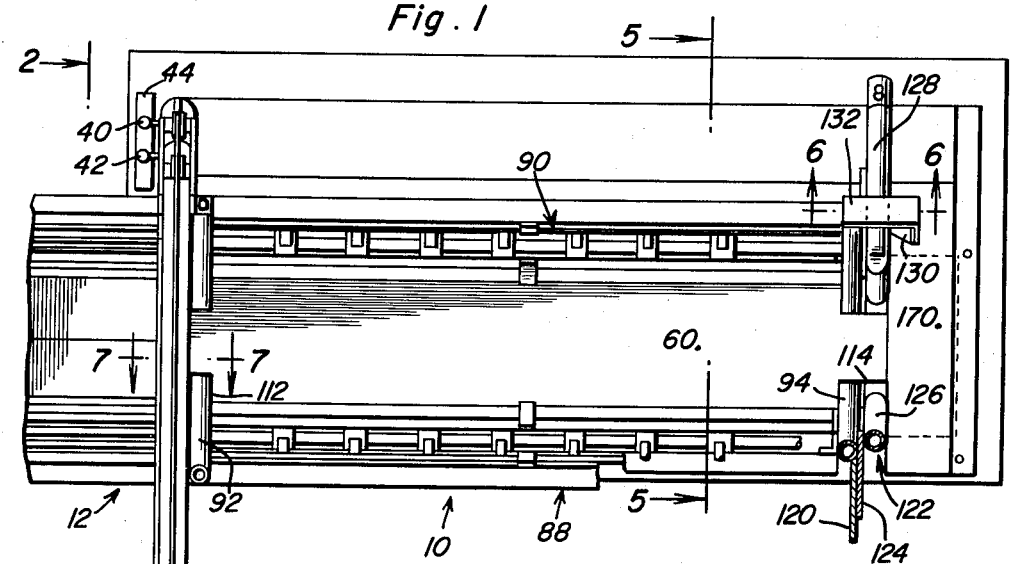
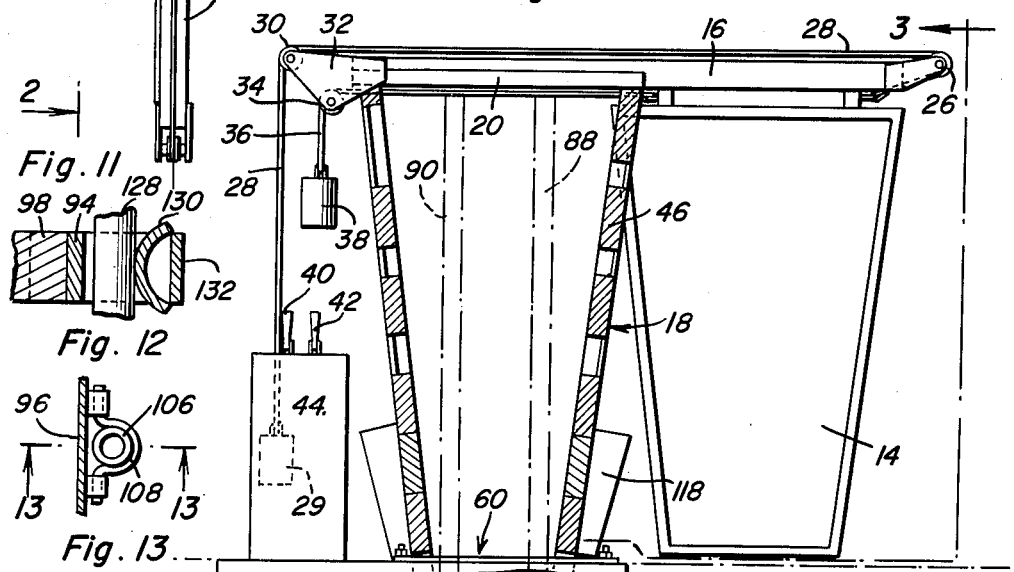
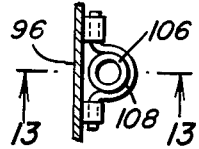
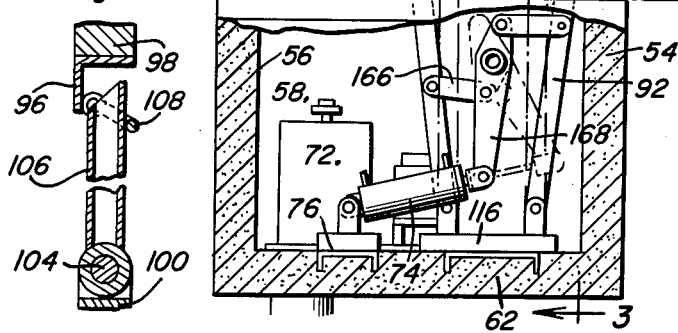
Keith C. Markegard
INVENTOR.

March 1, 1966   K. C. MARKEGARD   3,237,603
HYDRAULIC CATTLE VISE
Filed May 7, 1964   3 Sheets-Sheet 2
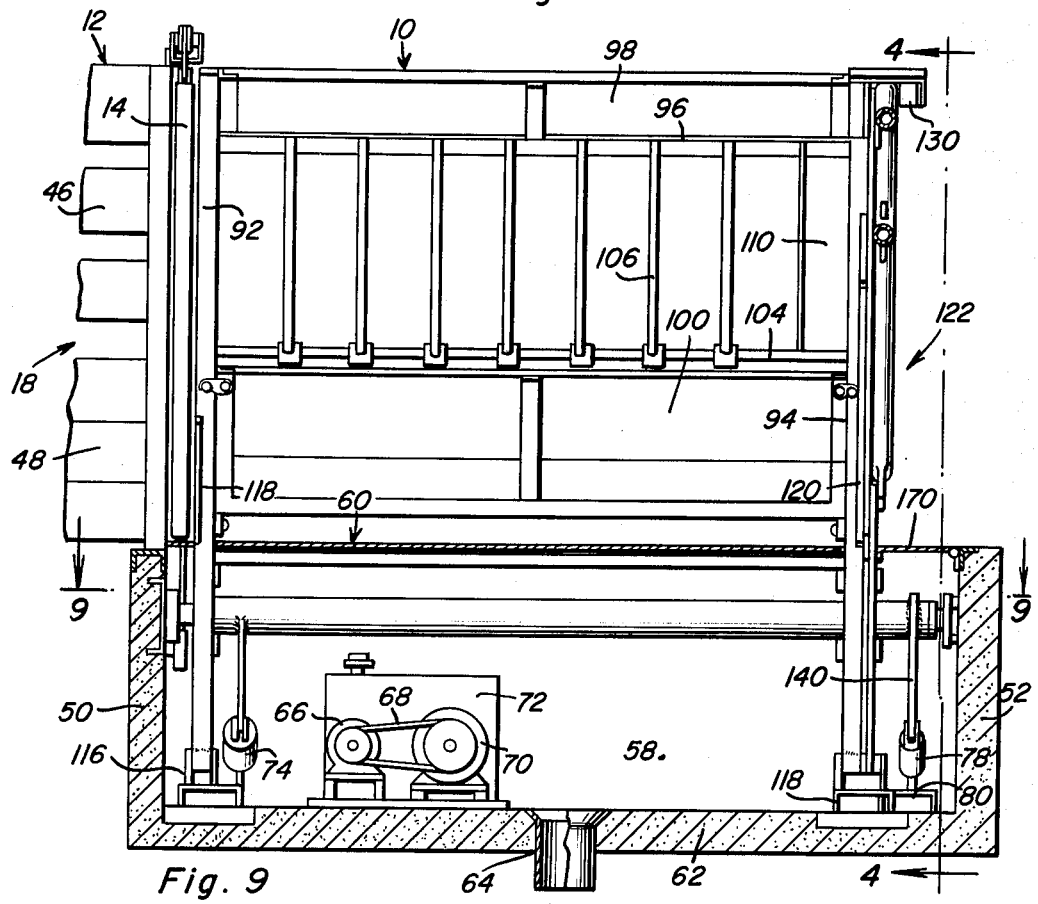
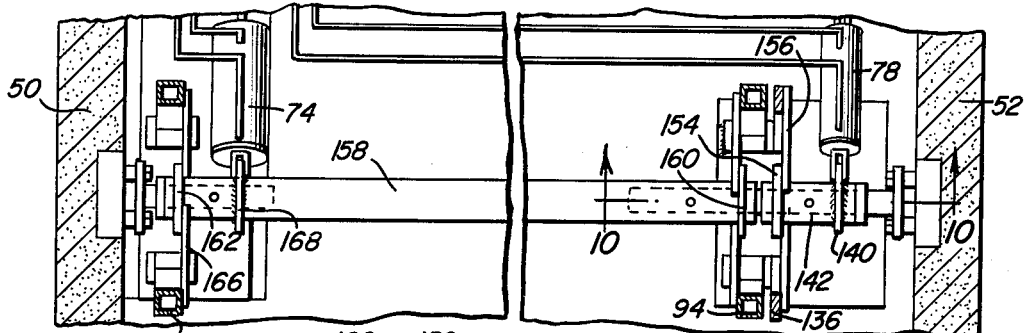
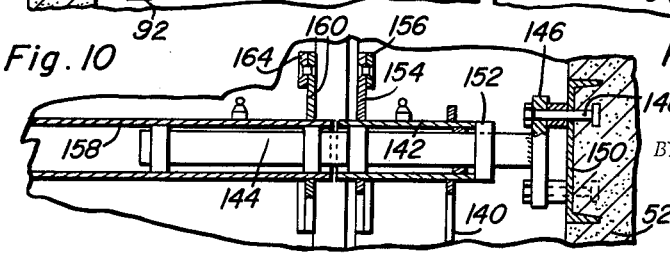
Keith C. Markegard
INVENTOR.

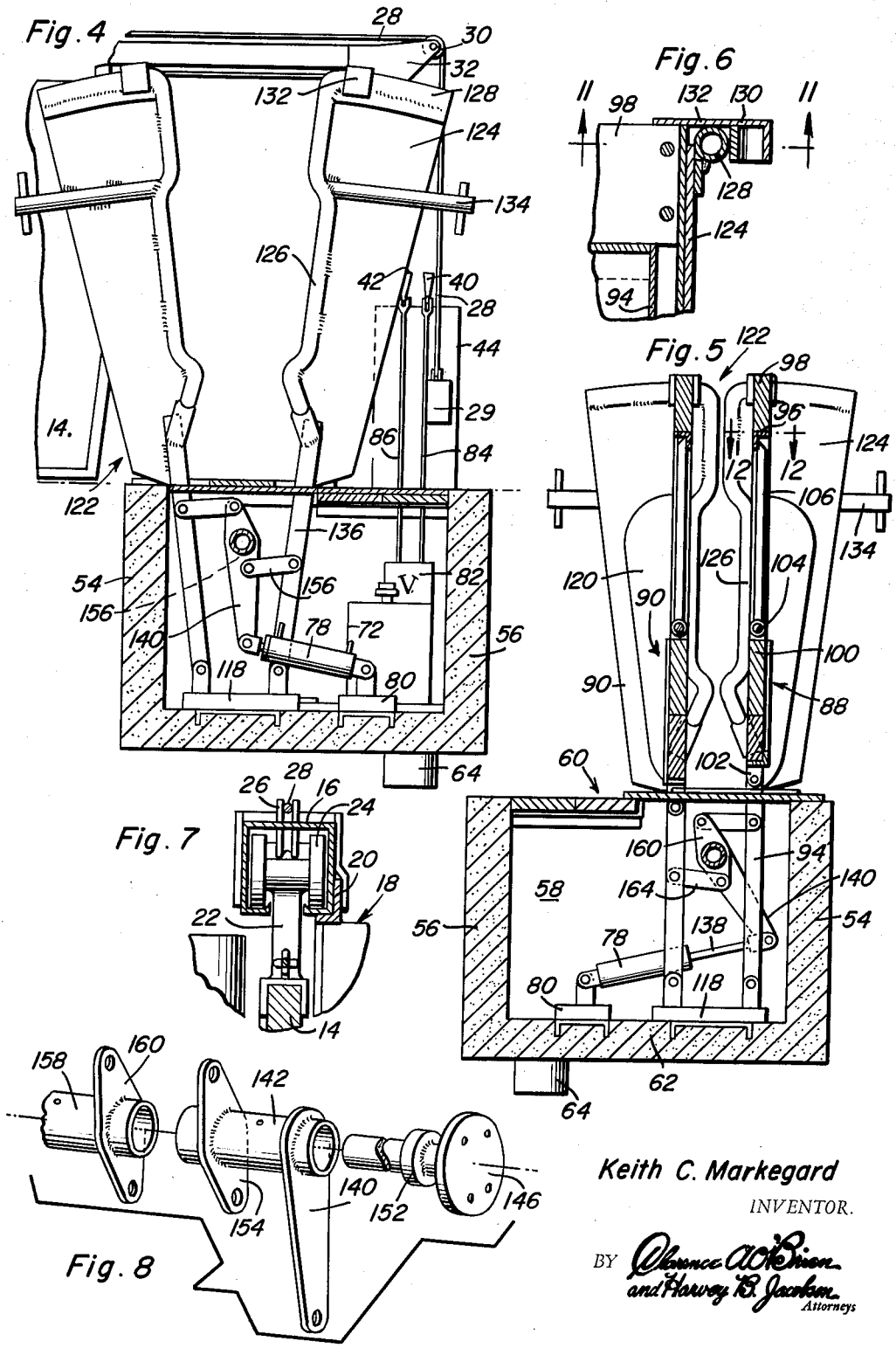

United States Patent Office 3,237,603
Patented Mar. 1, 1966

3,237,603
HYDRAULIC CATTLE VISE
Keith C. Markegard, 3048 Poly Drive, Billings, Mont.
Filed May 7, 1964, Ser. No. 365,698
12 Claims. (Cl. 119—99)

This invention relates to apparatus for holding and restraining cattle for various purposes including branding, vaccinating, dehorning, testing, etc.

Cattle holding and restraining apparatus have heretofore been devised but suffer from several disadvantages as compared to the apparatus of the present invention. Such prior equipment accordingly required adjustment in spacing so as to accommodate animals of different sizes and also involved exposed operating linkages requiring frequent repair and maintenance. Such prior restraining devices were also unable to effectively prevent movement of the animals without injury. It is therefore a primary object of the present invention to provide apparatus whereby animals may be more effectively held and restrained and without adjustments for accommodating animals of different sizes.

In accordance with the foregoing object, the apparatus of the present invention involves the pivotal support of body pressing panels and animal squeezing operation thereof by actuating linkages all located below the floor of the chute formed by the apparatus. Accordingly, a protective enclosure for the operating mechanism is provided as well as to provide operational support for the body pressing panels.

An additional object of the present invention is to provide apparatus involving body pressing panels capable of more effectively restraining animals by tending to raise the animals off the floor to the extent of removing the weight of the animal from the floor and thereby decrease its ability to struggle in an effort to free itself.

A still further object of the present invention is to provide a cattle holding and restraining device having a neck clamping vise portion more rapidly engageable with the animal than the body pressing panels so as to prevent the animal from leaving the passage between two body pressing panels subsequently operated with a slower but greater force than that associated with the neck clamping vise portion. Special operating linkages and hydraulic power operated devices are accordingly provided for this purpose.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the apparatus of the present invention;

FIGURE 2 is a side sectional view taken substantially through a plane indicated by the section line 2—2 of FIGURE 1;

FIGURE 3 is a sectional view taken substantially through a plane indicated by section line 3—3 in FIGURE 2;

FIGURE 4 is a sectional view taken substantially through a plane indicated by the section line 4—4 in FIGURE 3;

FIGURE 5 is a transverse sectional view taken substantially through a plane indicated by the section line 5—5 in FIGURE 1;

FIGURE 6 is an enlarged partial sectional view taken substantially through a plane indicated by the section line 6—6 in FIGURE 1;

FIGURE 7 is an enlarged partial sectional view taken substantially through a plane indicated by the section line 7—7 of FIGURE 1;

FIGURE 8 is a perspective view of disassembled portions of the operating linkage associated with the apparatus of the present invention;

FIGURE 9 is a partial sectional view taken substantially through a plane indicated by the section line 9—9 in FIGURE 3;

FIGURE 10 is an enlarged partial sectional view taken substantially through a plane indicated by the section line 10—10 of FIGURE 9;

FIGURE 11 is a partial sectional view taken substantially through a plane indicated by the section line 11—11 in FIGURE 6;

FIGURE 12 is an enlarged partial sectional view taken substantially through a plane indicated by the section line 12—12 in FIGURE 5;

FIGURE 13 is a partial sectional view taken substantially through a plane indicated by the section line 13—13 in FIGURE 12.

Referring now to the drawings in detail, it will be observed from FIGURES 1 and 3 that the apparatus of the present invention generally referred to by the reference numeral 10 is disposed adjacent the outlet end of an entrance chute 12 through which animals are guided before entering the apparatus. The outlet end of the entrance chute may therefore be closed or opened by a gate 14 slidably suspended from an overhead track 16 as more clearly seen in FIGURES 2 and 7. The track may therefore be supported between the upper edges of the walls 18 of the entrance chute at the outlet end by means of the angle iron 20, the track extending laterally from one side of the walls so as to support the gate 14 in a position opening the outlet end of the entrance chute. The gate is therefore provided with a pair of upwardly extending support brackets 22 which rotatably mount the rollers 24 received within the track 16. The laterally extending end of the track is provided with a pulley 26 about which the cable 28 is entrained, one end of the cable being connected to the gate, and the other end being connected to a counterbalancing weight 29. The cable 28 therefore is also entrained about a pulley 30 from which the cable extends downwardly for connection to the counterbalancing weight 29. The pulley 30 is rotatably mounted on a bracket assembly 32 which extends from the track 16 and which also rotatably mounts a pulley 34 about which a cable 36 is entrained, one end of the cable 36 being connected to another counterbalancing weight 38 while the other end of the cable is connected to the gate 14. It will therefore be apparent that the gate 14 will be counterbalanced so as to permit easy movement thereof between its closed and open positions by pulling downwardly on either the cable 28 or 36 located on one side of the entrance chute 12 at the outlet end just forwardly of a control station at which a pair of selector control handles 40 and 42 are pivotally mounted on the control support 44. Thus, it will be apparent that the control station is located adjacent the outlet end of the entrance chute through which animals are guided between the walls 18, each of the walls including a plurality of longitudinal boards 46 which are vertically spaced as more clearly seen in FIGURES 2 and 3 with no spacing between the lower boards 48 so as to prevent the animal's feet from getting caught therebetween.

The control station is located above the concrete end wall 50 of an excavated pit having an opposite end wall 52. The end walls are interconnected by side walls 54 and 56 to form an enclosure so as to define a chamber 58 located below a floor assembly 60 on which the animals are supported when entering the apparatus 10. A bottom wall 62 is connected to the side and end walls and is provided with a drain 64 as more clearly seen in FIGURE 3. Operating mechanism for the apparatus is therefore located within the chamber 58 and supported on the walls thereof including a prime mover such as electric motor 66 drivingly connected by the belt 68 to a pump mechanism 70 associated with a fluid reservoir 72. Fluid under pressure is thereby supplied to a hydraulic cylinder device 74 pivotally anchored to the bottom wall 62 by the anchor assembly 76 located adjacent to the end wall 50 as more clearly seen in FIGURE 2. Fluid under pressure may also be supplied to another hydraulic cylinder device 78 pivotally anchored to the bottom wall by the anchor assembly 80 as more clearly seen in FIGURES 4 and 5, the cylinder device 78 being located adjacent the end wall 52 as more clearly seen in FIGURE 9. Accordingly, each of the cylinder devices is connected to a pair of hydraulic lines through which fluid under pressure is supplied to either end of the cylinder device for expansion or retraction of the piston therefrom under control of the valve assembly 82 to which the control handles 40 and 42 are connected by the control links 84 and 86 as more clearly seen in FIGURE 4. It will be observed that the diameter of the cylinder device 74 is larger than that of the cylinder device 78 and that the piston associated with the larger diameter cylinder device 74 has the shorter stroke for reasons to be hereafter explained. Actuation of the cylinder devices 74 and 78 may therefore be independently effected by the operator through control handles 40 and 42.

Referring now to FIGUURES 1, 3 and 5, it will be observed that a pair of body pressing panel assemblies 88 and 90 are movably mounted above the floor assembly 60 so that in the open position the panel assemblies will be aligned with the walls 18 of the entrance chute in order to receive therebetween animals of different sizes. The panel assemblies are displaceable toward each other by any amount necessary to press or squeeze the body of the animal. Each of the panel assemblies is similar in construction and includes a pair of end posts 92 and 94, the end post 92 being located and spaced adjacent to the outlet end of the entrance chute. Interconnected between the upper ends of the posts 92 and 94, is an angle member 96 and a board 98. Also interconnecting the posts just above the floor 60, are a pair of boards 100. In the case of the panel assembly 88 the boards 100 may be hingedly connected by the hinge assembly 102 between the posts as more clearly seen in FIGURE 5 so that the lower portion of the panel assembly may be opened as shown by dotted lines in FIGURE 5 in order to assist an animal that has fallen. A hinge bar 104 also interconnects the posts 92 and 94 intermediate the lower and upper edges of the panel assemblies so as to pivotally support a plurality of horizontally spaced bars 106. The bars 106 as more clearly seen in FIGURES 12 and 13 are held in position by pivoted latches 108 hinged to the angle iron member 96. It will therefore be apparent that any one or more of the bars 106 may be lowered so as to expose any portion of the animal for treatment. A solid panel 110 is however mounted between the angle iron member 96 and the hinge bar 104 at the forward end of the panel assemblies as more clearly seen in FIGURE 3.

The posts 92 and 94 of the panel assemblies extend downwardly into the chamber 58 through slots 112 and 114 formed in the floor assembly 60 as more clearly seen in FIGURE 1. With continued reference to FIGURES 2, 3 and 9, it will be observed that the posts 92 extend downwardly adjacent the end wall 50 of the chamber 58 and are pivotally supported in spaced relation to each other by the pivotal support bracket 116 anchored to the bottom wall. Similarly, the posts 94 of the panel assemblies are pivotally supported by the pivotal support bracket 118 closer to the end wall 52. Thus, the panel assemblies 88 and 90 are angularly displaceable about horizontal axes spaced below the floor assembly 60 so that even the lowermost engaging portions of the panel assemblies at floor level will engage the feet of the animal since the pivots are not located at floor level as in prior art arrangements. In the open positions of the panel assemblies therefore, the end posts extend upwardly at diverging angles so that the arcuate movement of all engaging portions of the panel assemblies above the floor 60 toward each other will progressively engage an animal upwardly from floor level and thereby more effectively restrain the animals from use of force applied to the floor through the feet. Further, since the lower engaging portions of the panels are not pivotally fixed to the floor, animals of different sizes may be received without any adjustment. Each of the panel assemblies is also provided with a leg guard 118 laterally extending from the post 92 at the inlet end and with a leg guard 120 laterally extending from the post 94 at the outlet end. The animal will therefore enter between the panel assemblies in the open positions thereof from the entrance chute. As the neck or head of the animal exits from the panel assemblies it is rapidly clamped by a vise assembly generally referred to by the reference numeral 122 so as to prevent further forward movement of the animal.

Referring now to FIGURES 1, 3, 4 and 5 it will be observed that the vise assembly 122 includes a pair of plate members 124, the confronting edges of which are welded to tubular engaging rims 126 having recess portions between which the neck or head of the animal is clamped. The engaging rim is connected to an upper arcuate portion 128 so as to be guidingly received between the upper end of the posts 94 of the panel assemblies and the arcuate guide elements 130 secured in spaced relation thereto by the guide brackets 132, as more clearly seen in FIGURES 6 and 11. Also secured to the plate members 124 and extending laterally therefrom are tie bars 134 as more clearly seen in FIGURE 4. The tie bars are provided so as to enable tying of the head of the animal to the vise assembly for dehorning, blood tests and similar purposes. The plate members are supported for pivotal movement toward each other from the open position illustrated in FIGURE 4, by means of posts 136 which are welded to the bottom of the plate members and extend downwardly through the slots 114 in the floor assembly for pivotal support by the support bracket 118 anchored to the bottom wall 62 closely adjacent to the post 94. The plate members 124 of the vise assembly are therefore adapted to be pivotally displaced toward each other from the open position at a relatively rapid speed as compared to the relatively slower movement with which the panel assemblies are engaged with the animal.

The relatively rapid movement of the plate members 124 of the vise assembly is achieved by extension of the piston rod 138 from the hydraulic cylinder device 78. The piston rod 138 is therefore pivotally connected to the lower end of an actuating arm 140 rigidly connected to a sleeve element 142 rotatably mounted between a pair of bearing rings on a fixed shaft 144 secured to the end wall 52. As will be clearly seen in FIGURES 9 and 10, the shaft 144 is connected at one end to an anchor plate 146 secured by the anchor bolt assemblies 148 and the anchoring channels 150 to the end wall 52. An end thrust collar 152 is also secured to the shaft 144 and is disposed in abutting relation to the sleeve 142 to which the arm 140 is connected. Also connected to the sleeve 142 as more clearly seen in FIGURE 8 is an arm 154 the opposite ends of which are connected by links 156 to the posts 136 so as to impart pivotal movement to the plate members 124 when the piston rod 138 is extended or retracted.

An elongated control sleeve 158 is supported adjacent one end on spaced bearing rings secured to the shaft 144 and to spaced bearing rings on a similar shaft secured to the end wall 50. Connected as by welding adjacent opposite ends of the control sleeve 158, are the link arms 160 and 162 whereby angular displacement of the control sleeve 158 may impart pivotal movement without twist to the panel assemblies 88 and 90. The posts 94 of the panel assemblies are therefore connected to the link arm 160 by the links 164 while the posts 92 by the links 166. Angular displacement is imparted to the control sleeve 158 by pivotal connection of the piston rod of the cylinder device 74 to the lower end of the actuator arm 168, the arm 168 being secured as by welding to the control sleeve 158 adjacent to the link arm 162. The actuating arm 140 is not as long as the actuating arm 168 associated with the cylinder device 74 in view of the shorter stroke associated with the cylinder device 74. It will therefore be apparent that pivotal movement of the plate members 124 of the vise assembly will be effected more rapidly and with less force for engagement of the neck or head of the animal as compared to the less rapid or slower movement of the body squeezing panel assemblies into engagement with the animal with a greater force necessary to raise the animal off the floor.

From the foregoing description the construction, installation and operation of the apparatus of the present invention will be apparent. It will therefore be appreciated that the arrangement of the present invention with the pivotal mounting of the body squeezing panel assemblies and the vise assembly below the floor 60 will not only effectively enclose the linkages and power operated mechanism but will also permit such orientation of the body squeezing panel assemblies tending as to lift animals of different sizes off the floor when displaced into engagement therewith by removing the weight from the floor. By enclosing the supporting and actuating structure for the squeeze panels below the floor, visible frame and linkage structure is avoided which discourages animals from freely entering the squeeze chute. Thus, the arrangement of the present invention is further advantageous in this regard since the animals require substantially less inducement to enter. Access to the chamber 58 below the floor is also provided by upwardly swinging a hinged portion 170 of the floor as more clearly seen in FIGURES 1 and 3. Also of considerable advantage is the arrangement of the linkages and hydraulic cylinder devices which are independently operated in order to actuate the vise assembly 122 and panel assemblies at the proper speeds and with the proper forces.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal restraining device comprising an entrance chute having a pair of fixedly spaced walls between which animals are guided, a pair of panels movably mounted adjacent said walls for guided reception of the animal from the entrance chute, an enclosure forming a chamber aligned below the panels, pivotal mounting means disposed within the chamber and connected to the panels thereabove for pivotal support thereof about axes spaced below the panels, a floor mounted on the enclosure below the panels for support of the animals thereon between said panels, power operated means connected to the pivotal mounting means within the chamber for displacing said panels about said axes in directions engaging the animals to remove the weight thereof from the floor; vise means movably mounted adjacent one end of the panels remote from the entrance chute and connected to the power operated means, and selective control means operatively connected to the power operated means for rapidly clamping the animals within the vise means and more slowly engaging the animals with the panels.

2. The combination of claim 1 wherein said power operated means comprises a pair of control elements rotatably mounted within the chamber, a pair of fluid actuating devices having different strokes respectively connected to the control elements for angular displacement thereof at different speeds, and linkage means interconnecting the control elements to the panels and the vise means respectively.

3. The combination of claim 2 including guide means interconnecting the panels and the vise means in spaced relation above the floor for guiding relative movement therebetween.

4. The combination of claim 3 including gate means slidably movable between the entrance chute and the panels, and track means slidably suspending the gate means above the floor between the entrance chute and the panels.

5. The combination of claim 4 wherein each of said panels includes a pair of posts extending through the floor into the chamber for pivotal mounting therein, and rigid elements interconnecting said posts above the floor.

6. The combination of claim 1 wherein each of said panels includes a pair of posts extending through the floor into the chamber for pivotal mounting therein, and rigid elements interconnecting said posts above the floor.

7. An animal restraining device comprising a paint of panels, an enclosure forming a chamber aligned below the panels, pivotal mounting means disposed within the chamber and connected to the panels thereabove for pivotal support thereof in open positions, a floor mounted on the enclosure below the panels for support of the animals thereon between said panels and power operated means connected to the pivotal mounting means within the chamber for displacing said panels from said open positions in directions engaging and raising the weight of the animals off the floor.

8. The combination of claim 7 including vise means connected to the power operated means, and selective control means operatively connected to the power operated means for rapidly clamping the animals within the vise means at locations spaced above the floor and more slowly and progressively engaging the animals upwardly from floor level by the panels.

9. The combination of claim 8 wherein said power operated means comprises a pair of control elements rotatably mounted within the chamber, a pair of fluid actuating devices having different strokes respectively connected to the control elements for angular displacement thereof at different speeds and linkage means interconnecting the control elements.

10. The combination of claim 7 wherein each of said panels includes a pair of posts extending through the floor into the chamber for pivotal mounting therein and elongated rigid body engaging elements interconnecting said posts above the floor.

11. In combination with an animal chute and a floor, body pressing means mounted above the floor for guiding animals leaving said chute, neck clamping means for engaging the animals in spaced relation above the floor to hold the animals within the body pressing means, means pivotally mounting the body pressing means about axes spaced below the floor for engaging the animals at floor level and above, and power operated means connected to the body pressing means and the clamping means for selective operation thereof at different speeds.

12. In an animal squeeze device, a supporting floor, a pair of side panels diverging upwardly from the floor having lower engaging portions variably spaced along the floor, a mounting structure disposed below the floor, said panels having extensions projecting downwardly through the floor into the mounting structure, means connected to the extensions within the mounting structure for establishing pivotal supporting axes spaced below the floor, and power operated means operatively connected to said extensions below the floor for pivotally displacing the side panels about said supporting axes to vary the spacing between the lower engaging portions of the panels along the floor and thereby restrain animals from use of force applied to the floor through the feet.

References Cited by the Examiner

UNITED STATES PATENTS

| 970,344 | 9/1910 | Mills | 119—99 X |
| 2,912,715 | 11/1959 | Moss | 119—99 X |
| 2,995,111 | 8/1961 | Darden | 119—99 |

SAMUEL KOREN, *Primary Examiner.*

HUGH R. CHAMBLEE, *Examiner.*